United States Patent [19]
Kato

[11] Patent Number: 5,177,767
[45] Date of Patent: Jan. 5, 1993

[54] SPREAD-SPECTRUM COMMUNICATION SYSTEM

[75] Inventor: Ichiro Kato, Tokyo, Japan

[73] Assignee: Canon Kabushiki Kaisha, Tokyo, Japan

[21] Appl. No.: 664,298

[22] Filed: Mar. 4, 1991

[30] Foreign Application Priority Data

Mar. 6, 1990 [JP] Japan .................................. 2-56133

[51] Int. Cl.⁵ .............................................. H04L 9/00
[52] U.S. Cl. ........................................ 375/1; 380/48
[58] Field of Search ...................... 375/1, 114; 380/48; 370/100, 102, 107, 108

[56] References Cited

U.S. PATENT DOCUMENTS

| | | | |
|---|---|---|---|
| 4,071,692 | 1/1978 | Weir et al. ................................ | 375/1 |
| 4,837,823 | 6/1989 | Ham et al. ............................. | 380/48 |
| 4,941,150 | 7/1990 | Iwasaki .................................. | 375/1 |

Primary Examiner—David Cain
Attorney, Agent, or Firm—Fitzpatrick, Cella, Harper & Scinto

[57] ABSTRACT

In order to eliminate the need for spread-spectrum code synchronization, a code divided into a suitable number of digits is applied to a transmitter and a receiver. The transmitter multiplies an original signal by each subdivision of the code to produce n-number of new baseband signals. Carrier waves having n-types of frequencies are modulated by these signals and the modulated signals are added to obtain an ultra-wide band signal, which is then transmitted to the receiver. The receiver separates the received signal into the narrow band components which prevailed prior to the adding operation in the transmitter, and then demodulates each component into a baseband signal. Each of these demodulated signals is multiplied by a code the same as that on the transmitting side, whereby n-number of original signals are obtained. Original signals obtained from a signal spread by a code different from that of the receiver are not n in number. Thus, spread-spectrum communication can be realized without requiring spread-spectrum code synchronization.

45 Claims, 6 Drawing Sheets

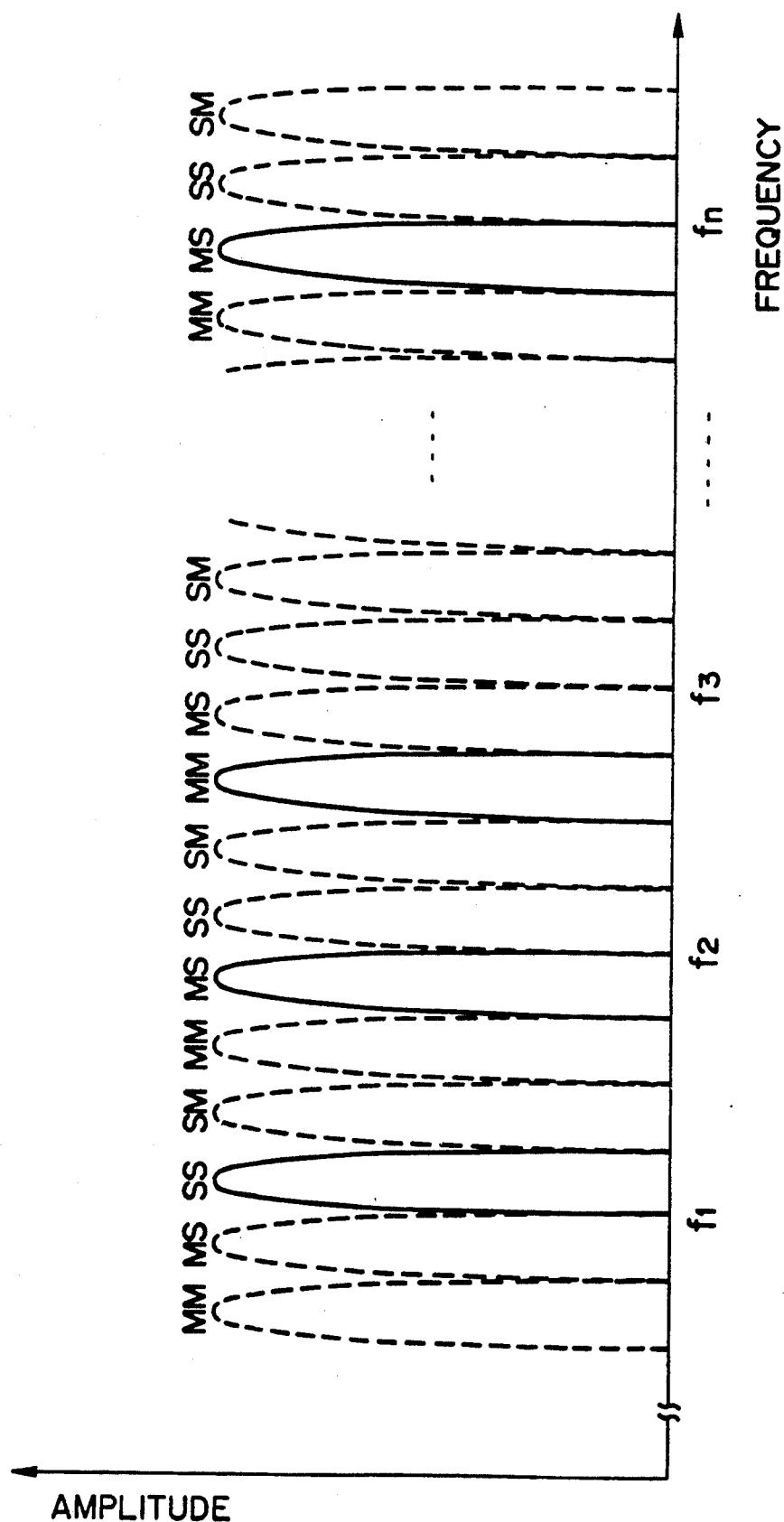

SPREAD-SPECTRUM COMMUNICATION SYSTEM

BACKGROUND OF THE INVENTION

1. Field of the Invention

This invention relates to a spread-spectrum communication system in which, when information is transmitted by wire or wirelessly, the information is converted into a signal having a bandwidth much greater than that of the information band.

2. Description of the Prior Art

A spread-spectrum communication system is one in which information data is transmitted as a signal whose bandwidth is made much larger than that of the data. Broadly classified, two methods are available for achieving such communication. One method is a so-called direct-sequence (DS) method, in which the transmitting side multiplies a digitized baseband signal by a spread spectrum code such as a high-speed pseudorandom noise code to generate a baseband signal having a bandwidth much greater than that of the original data. The generated signal is modulated as by phase-shift keying (PSK) or frequency-shift keying (FSK) to be converted into a radio-frequency (RF) signal before being transmitted. On the receiving side, a spread-spectrum code the same as that on the transmitting side is used to perform reverse spreading, which is for establishing correlation with the received signal. Thus, demodulation is performed to obtain the original data.

The second method is referred to as so-called frequency hopping (FH), in which the transmitting side modulates a carrier wave by a baseband signal and transmits a signal by periodically changing frequency, in accordance with a spread-spectrum code, every data bit or at a time interval which is a whole-number fraction or a whole-number multiple thereof. On the receiving side, demodulation is performed to obtain the original data by carrying out reverse spreading. This is accomplished by performing a correlating operation, in which the local carrier wave on the receiving side is brought in tune with the transmitting side by using a spread-spectrum code the same as that on the transmitting side.

In order to achieve correct correlation on the receiving side in these systems, it is necessary for the spread-spectrum code on the transmitting side and that on the receiving side to be synchronized accurately. In the prior art, synchronizing circuits for achieving this synchronization employ a so-called sliding correlation loop.

FIG. 4 is a diagram illustrating a sliding correlation loop for the DS method. As shown in FIG. 4, a received spread-spectrum signal enters a mixer 401, which multiplies this input by a spread-spectrum code sequence generated by a spread-spectrum code-sequence generator 406. The output of the mixer 401 enters a band-pass filter (BPF) 402 having a bandwidth corresponding to that of the original data prior to spreading. The filtered output of the BPF 402 enters a detector circuit 403, which subjects this input signal to envelope detection. The output of the detector circuit 403 enters a low-pass filter (LPF) 404 to be smoothened thereby.

If autocorrelation is achieved, the output of the mixer 401 will be a signal resulting from reverse spreading of the received spread-spectrum signal. This output signal passes through the BPF 402 and has its envelope detected by the detector circuit 403. The output signal of the detector circuit 403 enters the LPF 404, which proceeds to smoothen the signal to obtain a DC level.

If autocorrelation is not achieved, a signal which is the result of reverse spreading of the received spread-spectrum signal is not obtained at the output of mixer 401, and therefore almost all of the power of the received spread-spectrum signal is blocked by the BPF 402. The output of the BPF 402 is subjected to envelope detection by the detector circuit 403, whose output signal is smoothened by the LPF 404. As a result, the DC level obtained is sufficiently small in comparison with that obtained at autocorrelation.

The DC-level output of the LPF 404 is supplied to a voltage-controlled oscillator (VCO) 405. Since the output of the LPF 404 has a sufficiently small DC level when autocorrelation is not achieved, the VCO 405 in such case produces an output whose frequency is somewhat different from that of the spread-spectrum code contained in the received spread-spectrum signal. The VCO 405 supplies this output to the spread-spectrum code-sequence generator 406 as a clock signal. In this case, since the speed of the clock of the spread. spectrum code generated by the spread-spectrum code. sequence generator 406 is offset slightly from the clock speed of the received spread-spectrum signal, the phases of the two signals gradually become displaced from each other. As a result, by the time the two phases shift by an amount equivalent to one period of the spread. spectrum code, coincidence is achieved between the spread-spectrum code in the received spread-spectrum signal and the spread spectrum generated by the code-sequence generator 406, and therefore autocorrelation is obtained. When this occurs, the DC output level of the LPF 404 rises, so that the oscillation frequency of the VCO 405 changes to a frequency synchronized to the received spread-spectrum signal, and the system stabilizes at this frequency. Thus, synchronization is achieved between the received spread-spectrum code and the spread-spectrum code generated by the spread-spectrum code sequence generator 406. The time needed to obtain synchronization with this method generally is very long since the phase of the received spread-spectrum code shifts only in gradual fashion.

FIG. 5 illustrates a sliding correlation loop for the FH method. The construction of the loop in FIG. 5 is similar to that of FIG. 4 except that a frequency synthesizer 507 is added.

In FIG. 5, the synthesizer 507 changes the frequency of the output signal in accordance with the pseudorandom noise signal which enters from a spread-spectrum code-sequence generator 506. A mixer 501 multiplies the output signal of the synthesizer 507 and the received spread-spectrum signal together. If the spread-spectrum code on the receiving side is in synchronism with that on the transmitting side, the signal obtained at the output of the mixer 501 will be a signal whose frequency band is the same as that of the signal prior to spreading. Operations performed by a BPF 502, detector circuit 503, LPF 504, VCO 505 and the code-sequence generator 506 are the same as in the DS method.

Thus, in conventional spread-spectrum communication systems, the spread-spectrum code is changed along a time axis. This means that circuitry for achieving spread-spectrum code synchronization is required on the receiving side, and that the time needed for achieving such synchronization by this circuitry is very long. These are some of the drawbacks encountered in the prior art.

SUMMARY OF THE INVENTION

An object of the present invention is to provide a structurally simple spread-spectrum signal transmitting apparatus or receiving apparatus.

According to the present invention, the foregoing object is attained by developing the spread-spectrum code along a frequency axis, thereby dispensing with the need of a spread-spectrum code synchronizing circuit on the receiving side.

Another object of the present invention is to realize high-speed spread-spectrum communication by curtailing the time needed for code synchronization.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a spectrum diagram of signals on a transmission line in a third embodiment of the present invention.

DESCRIPTION OF THE PREFERRED EMBODIMENTS

First Embodiment

Figure 1:
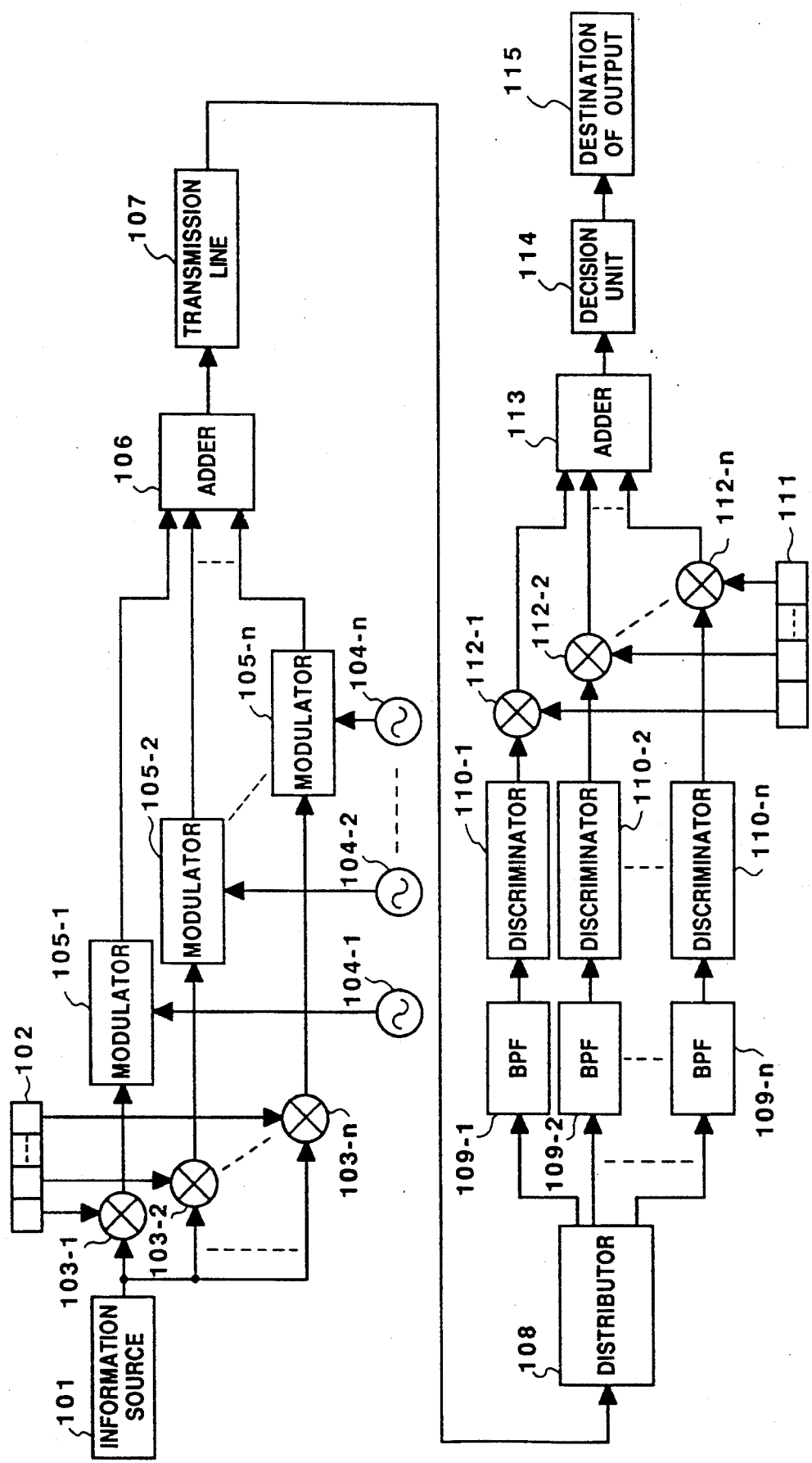
FIG. 1 is a block diagram illustrating a first embodiment of the present invention.

FIG. 1 illustrates the construction of the first embodiment, which includes an information input source 101, a spread-spectrum register 102 of length n, mixers 103-1 through 103-n, local oscillators 104-1 through 104-n, FSK modulators 105-1 through 105-n, an adder 106, a transmission line 107, a distributor 108, BPF's 109-1 through 109-n, frequency discriminators 110-1 through 110-n, a spread spectrum code register 111, mixers 112-1 through 112-n, an adder 113, a threshold decision unit (comparator) 114, and a destination 115 of the output information.

In the arrangement described above, binary data (1 or −1) outputted by the information source 101 enters mixers 103-1 through 103-n. The mixers 103 multiply the input data, one digit at a time, by each digit (1 or −1) of the spread-spectrum code sequence of length n stored in the register 102. The outputs of the mixers 103-1 through 103-n are applied respectively to the FSK modulators 105-1 through 105-n, which FSK modulate the carrier-wave outputs of the respective local oscillators 104-1 through 104-n by the outputs from the respective mixers. The outputs of the FSK modulators 105-1 through 105-n enter the adder 106, which adds these inputs and transmits the sum to the transmission line 107.

Figure 2:
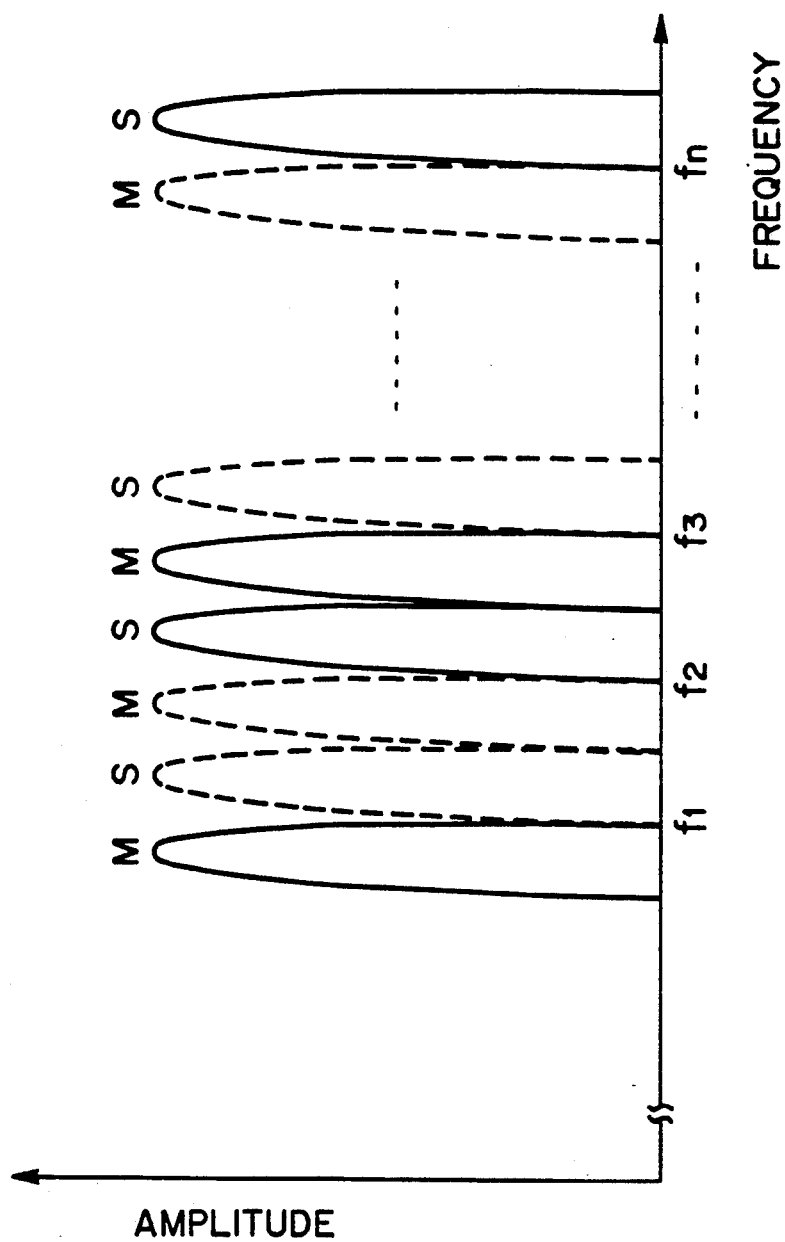
FIG. 2 is a spectrum diagram of signals on a transmission line in first and second embodiments of the present invention.

The output spectrum on transmission line 107 is shown in FIG. 2, in which $f_1$ through $f_n$ represent the carrier-wave frequencies of the respective local oscillators 104-1 through 104-n. The signals whose carrier waves have been modulated are distributed among frequencies of marks M or spaces S in accordance with the outputs of the mixers 103-1 through 103-n.

The signal received through the transmission line 107 is distributed to the n-number of BPF's 109-1 through 109-n via the distributor 108. The BPF's 109-1 through 109-n are bandpass filters having pass bandwidths corresponding to the information bandwidth, with the center frequencies being the carrier-wave frequencies $f_1$ through $f_n$ generated by the respective local oscillators 104-1 through 1004-n on the receiving side. Narrow bandwidth signals, which are the filtered outputs of the BPF's 109-1 through 109-n, enter the frequency discriminators 110-1 through 110-n, which convert these inputs into baseband voltage signals conforming to the frequency deviation. Next, the multipliers 112-1 through 112-n multiply the input baseband voltage signals by each digit of a spread. spectrum code sequence identical with that on the transmitting side, with the products being delivered to the adder 113. The latter adds up the n-number of inputs thereto. Since the receiving side uses a spread. spectrum code sequence identical with that on the transmitting side, all of the signals added are voltage signals corresponding to the marks or spaces of binary data outputted by the information source 101, which is the original data. Therefore, the sum of the signals is a voltage signal which is n times the original data. Even though noise is also added, the increase is only $\sqrt{n}$ fold at most. Accordingly, the signal-to-noise (S/N) ratio following addition is increased by $(n)^2/(\sqrt{n})^2 = n$. This signal enters the threshold comparator 114. The latter extracts the original data from the input and outputs this data to the destination 115 of the information output.

If it is so arranged that the spread spectrum code sequences stored in the spread spectrum registers 102 and 111 are selected from a set having little cross-correlation, then a receiving party using a different spread-spectrum code will not be able to obtain a signal which is n times the original signal as the output of the adder 113. As a result, the output of the adder 113 will not have enough signal power to be demodulated. This will make multiple access possible.

Second Embodiment

Figure 3:
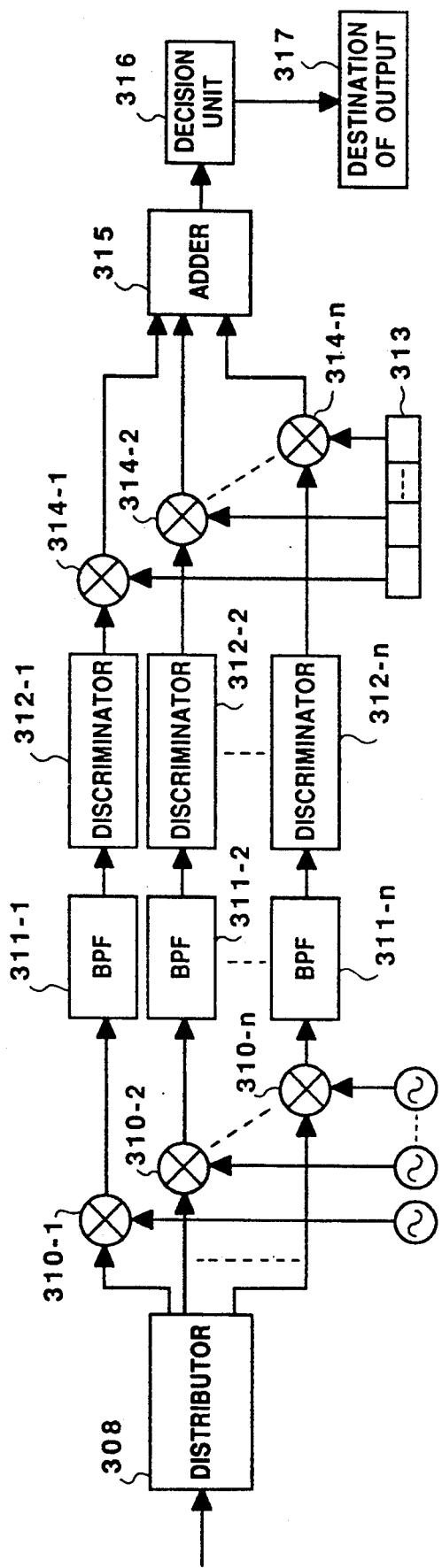
FIG. 3 is a block diagram showing the receiving side of the second embodiment of the invention.
Figure 4:
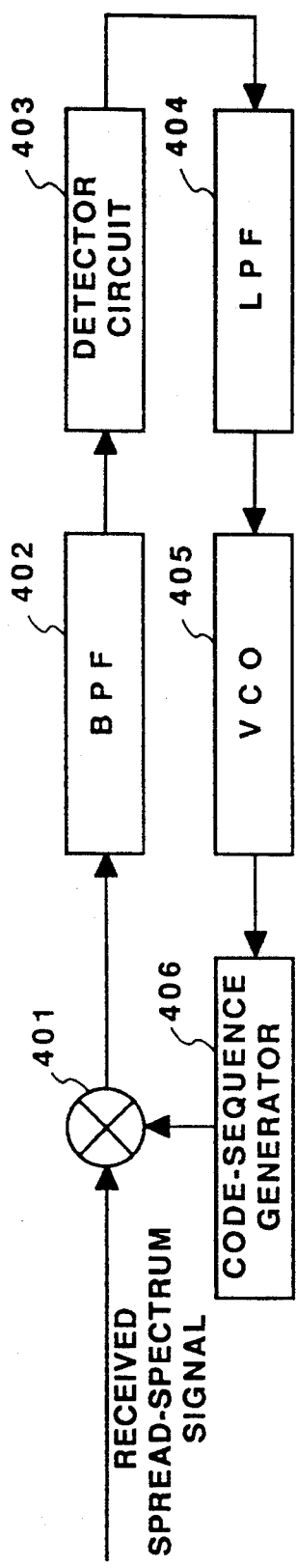
FIG. 4 is a block diagram showing a synchronizing circuit used in conventional spread-spectrum communication according to the DS method.
Figure 5:
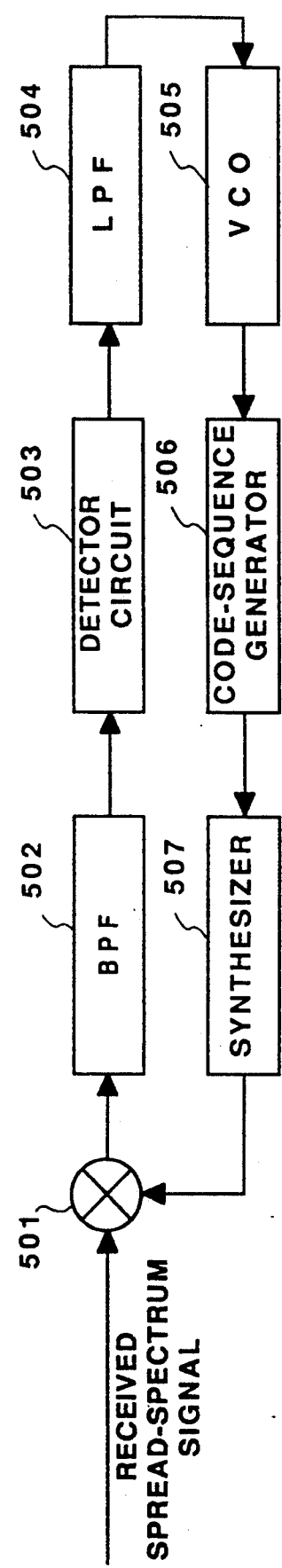
FIG. 5 is a block diagram showing a synchronizing circuit used in conventional spread-spectrum communication according to the FH method.

FIG. 3 illustrates the receiving side according to a second embodiment of the present invention. The transmitting side is the same as that of the first embodiment. The receiving side in FIG. 3 includes a distributor 308, local oscillators 309-1 through 309-n, mixers 310-1 through 310-n, BPF's 311-1 through 311-n, frequency discriminators 312-1 through 312-n, a spread. spectrum code register 313, multipliers 314 1 through 314-n, an adder 315, a threshold decision unit 316, and a destination 317 for the information output.

The distributor 308 distributes the received signal to the n-number of mixers 310-1 through 310-n. The latter multiply the received signals by respective ones of the outputs from the local oscillators 309-1 through 309-n. In this case output frequencies $f_1'$ through $f_n'$ of the respective local oscillators 309-1 through 309-n are selected in such a manner that the differences between these frequencies and the output frequencies $f_1$ through $f_n$ of the local oscillators 104-1 through 104-n on the transmitting side will be fixed at $f_i f_i' = f_{IF}$ (a constant, where $i = 1$ through n). The outputs of the mixers 310-1 through 310-n enter the BPF's 311-1 through 311-n whose pass bandwidths have an identical center frequency of $f_{IF}$ and correspond to the information bandwidth. The BPF's 311-1 through 311-n output narrow bandwidth signals, which are equal to the pass bandwidth. The frequency discriminators 312-1 through 312-n convert these output signals into baseband voltage signals conforming to the frequency deviation.

Other operations from multiplication with the spread-spectrum code onward are the same as in the first embodiment.

This embodiment differs from the first embodiment in that the group of signals of center frequencies $f_1$ through $f_n$ spread by the transmitting side is converted on the receiving side into a group of signals having the same intermediate frequency $f_{IF}$. As a result, the BPF group and frequency discriminator group can be made BPF's and discriminators having identical frequency characteristics. This is convenient in terms of manufacture. With this method, however, special attention must be given to the manner of selecting the intermediate frequency $f_{IF}$. The inputs to the mixer 310-i is the received signal and the signal of frequency $f_i'$, which is the output of the local oscillator 309-i. Since the received signal has a frequency of $f_1$ through $f_i$, the output of the mixer 310-i is the component of $(f1 + f_i'; j = 1 \ldots n)$ and $(f] f_i'; j = 1 \ldots n)$. Since the BPF-i passes $(fIF = fi\, f_i')$ and blocks other frequencies, $f_{IF}$ must be selected in such a manner that the relation $(f_j + f_i' = f_{IF}, j = 1 \ldots n)$ will be avoided.

Third Embodiment

In the above-described embodiments, the spread-spectrum code is multiplied, digit by digit, by the same digit of the transmitted information to perform FSK modulation of the binary level. However, it is permissible to adopt an arrangement in which communication is carried out by FSK modulation of a multivalued level.

Figure 6:
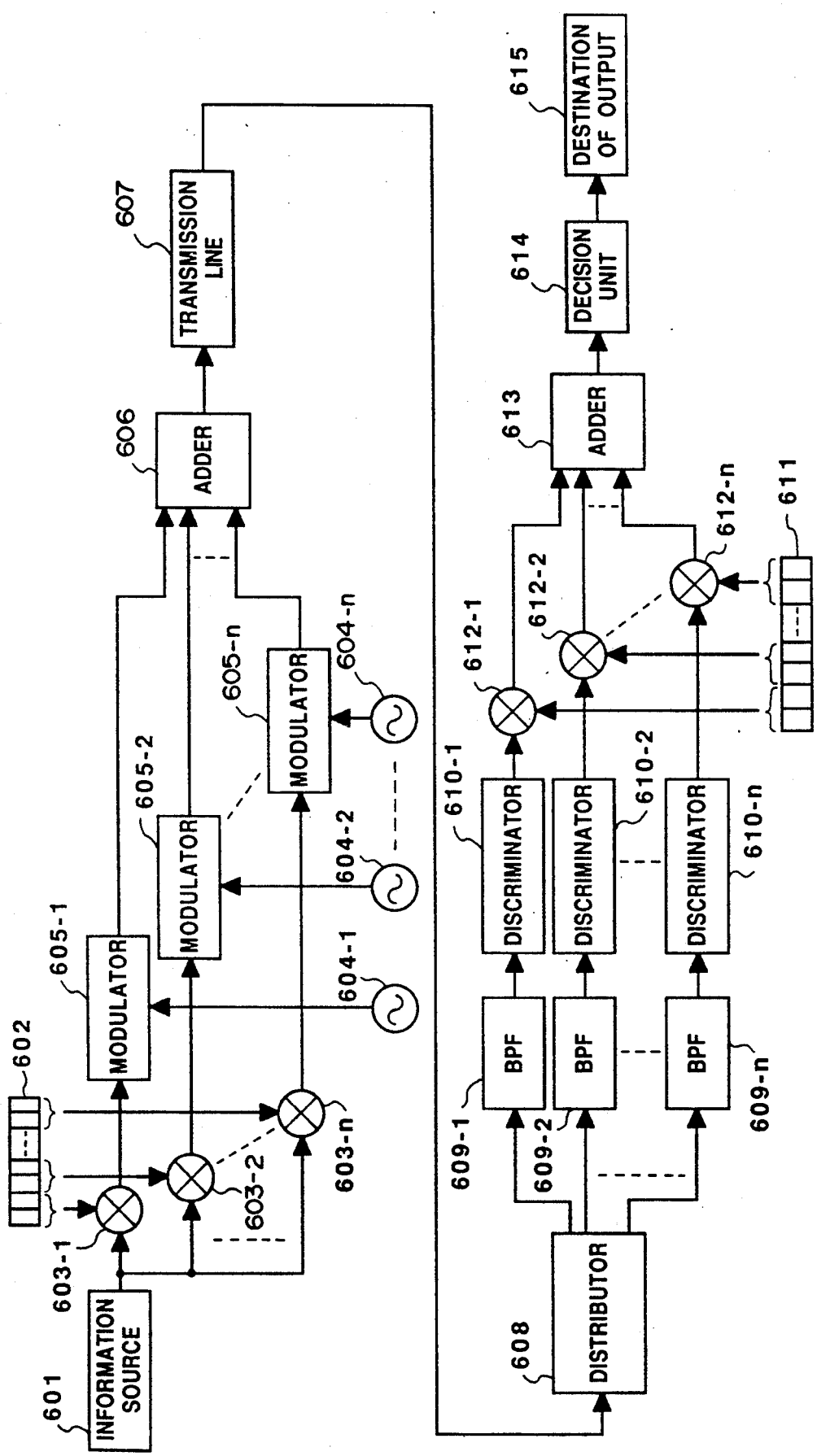
FIG. 6 is a block diagram showing a third embodiment of the present invention.

FIG. 6 is an example of an arrangement in which four values are taken as an embodiment of multivalued level modulation.

This embodiment includes an information input source 601, a spread-spectrum register 602 of length 2n, two digit mixers 603-1 through 603-n, local oscillators 604-1 through 604-n, FSK modulators 605-1 through 605-n, an adder 606, a transmission line 607, a distributor 608, BPF's 609-1 through 609-n, frequency discriminators 610-1 through 610-n, a spread-spectrum code register 611, mixers 612-1 through 112-n, an adder 613, a threshold decision unit 614, and a destination 615 of the output information.

In the arrangement described above, binary data outputted by the information source 601 enters the mixers 603-1 through 603-n. The mixers 603 each multiply two consecutive digits of the input data by two consecutive digits of the spread-spectrum code sequence of length 2n stored in the register 602. Each mixer outputs two-digit, i.e., four-value data. The outputted data from the mixers 603-1 through 603-n is applied respectively to the FSK modulators 605-1 through 605-n, which FSK-modulate the carrier-wave outputs of the respective local oscillators 604-1 through 604-n by the outputs from the respective mixers. The outputs of the FSK modulators 605-1 through 605-n enter the adder 606, which adds these inputs and transmits the sum to the transmission line 607.

The output spectrum on transmission line 607 is shown in FIG. 7, in which $f_1$ through $f_n$ represent the carrier-wave frequencies of the respective local oscillators 604-1 through 604-n. The modulated signals are distributed among the four frequencies MM-MS-SS-SM (where S represents space and M represents mark) in accordance with the outputs of the mixers 603-1 through 603-n.

As in the first embodiment, the received signal enters the distributor 608, which distributes it to the BPF's 609-1 through 609-n. The BPF's 609-1 through 609-n pass only signals having pass bandwidths corresponding to the information bandwidth, with the center frequencies being the frequencies $f_1$ through $f_n$. The passed signals enter the frequency discriminators 610-1 through 610-n, which generate baseband signals conforming to the frequency deviations of the input signals. Each output signal is four-value data which enters the respective mixers 612-1 through 612-n. These multiply the inputted data by two consecutive digits of the spread spectrum code sequence. The result are delivered to the adder 613.

The signal resulting from the adding operation is subjected to comparison just as in the first embodiment, and the original data inputted from the information source 601 is extracted.

Modulation of a multivalued level can be carried out with the arrangement described above. On the receiving side, as in the example of FIG. 3, a method can be adopted in which demodulation is performed after the conversion into intermediate frequency, which follows distribution into n-number of signals by the distributor 308.

By developing a spread-spectrum code along a frequency axis, as described above, it is possible to dispense with the need of a spread-spectrum code synchronizing circuit on the receiving side. In addition, temporal overhead at the time of initial information demodulation for spread-spectrum synchronization is eliminated, thereby making it possible to carry out initial synchronization at high speed. As a result, spread-spectrum communication having a wide range of applications can be achieved.

Further, in accordance with the present invention, code synchronization on the transmitting and receiving sides is not lost during communication. As a result, re-synchronization is unnecessary and highly reliable communication can be performed.

As many apparently widely different embodiments of the present invention can be made without departing from the spirit and scope thereof, it is to be understood that the invention is not limited to the specific embodiments thereof except as defined in the appended claims.

I claim:

1. A spread-spectrum signal transmitting apparatus comprising:

first generating means for generating, in parallel, a plurality of carrier-wave signals having frequencies that different from one another;

second generating means for generating a spread-spectrum code sequence having a plurality of digits; and modulating means for modulating each of the plurality of carrier-wave signals generated by said first generating means, based upon information to be transmitted and each of the plurality of digits generated by said second generating means.

2. The apparatus according to claim 1, wherein said first generating means comprise a plurality of local oscillators.

3. The apparatus according to claim 1, wherein said second generating means generates digits the number of which is the same as the number of carrier-wave signals generated by said first generating means.

4. The apparatus according to claim 1, wherein said second generating means generates a spread-spectrum code sequence having digits the number of which is the same as, or a whole-number multiple of, the number of frequencies generated by said first generating means.

5. The apparatus according to claim 1, wherein said modulating means modulates each of the plurality of carrier-wave signals, which are generated by said first generating means, into a frequency 6. The apparatus according to claim 1, wherein said modulating means has multipliers the number of which is the same as the number of the plurality of digits generated by said second generating means;
transmitted information being supplied in parallel to respective ones of said multipliers, each multiplier multiplying the transmitted information by a respective one of the plurality of digits generated by said second generating means.

7. The apparatus according to claim 6, wherein said modulating means modulates the plurality of carrier-wave signals, which are generated by said first generating means, based upon respective ones of outputs from said multipliers.

8. A spread-spectrum signal transmitting apparatus comprising:
a plurality of multiplying means for multiplying each digit of a plurality of digits of a spread-spectrum code sequence by a corresponding digit representing information to be transmitted; and
modulating means for modulating an output of each of the plurality of multiplying means by a corresponding carrier wave signal, each carrier wave signal having a different frequency.

9. The apparatus according to claim 8, wherein the information to be transmitted is supplied to said plurality of multiplying means in parallel.

10. The apparatus according to claim 8, wherein said modulating mean comprises a plurality of local oscillators.

11. A spread-spectrum signal receiving apparatus comprising:
generating means for generating a spread-spectrum code sequence having a plurality of digits;
reverse spreading means for reverse-spreading a receive signal, for each of a plurality of frequency bands based upon each of the plurality of digits generated by said generating means; and
decision means for discriminating original data based upon a reverse-spread output procured by said reverse spreading means for each frequency band of the received signal.

12. The apparatus according to claim 11, wherein said levers spreading means comprises multipliers, the number of which is the same as the number of digits generated by said generating means, each multiplier multiplying the received signal by a corresponding one of the plurality of digits generated by said generating means.

13. The apparatus according to claim 12, wherein said generating means generates a spread-spectrum code sequence having digits the number of which is the same as, or a whole-number multiple of, the number of multiplying means.

14. The apparatus according to claim 11, wherein said reverse spreading means comprises a plurality of bandpass filters for splitting the received signal into a plurality of bandwidths.

15. The apparatus according to claim 11, wherein said decision means comprises adding means for adding a reverse-spread output produced by said reverse spreading means for each of a plurality of frequency bands, said decision means discriminating the original data based upon a sum output from said adding means.

16. A spread-spectrum signal receiving apparatus comprising:
a plurality of multiplying means for multiplying each digit representing a received signal by a corresponding digit of a plurality of digits of a spread-spectrum core sequence, said multiplication being performed for each of a corresponding carrier-wave frequency; and
decision means for discriminating original data based upon outputs from said plurality of multiplying means.

17. The apparatus according to claim 16, wherein said reverse spreading means comprises a plurality of bandpass filters for splitting the received signal into a plurality of bandwidths.

18. The apparatus according to claim 16, wherein said decision means comprises adding means for adding outputs from said plurality of multiplying means, said decision means discriminating the original data based upon an output from said adding means.

19. The apparatus according to claim 16, wherein each of said plurality of multiplying means multiplies each of the digits representing the received signal by two corresponding digits included in the plurality of digits of the spread-spectrum code sequence.

20. The apparatus according to claim 1, wherein said modulating means comprises a plurality of multipliers, and wherein each of the plurality of multipliers modulates each of the plurality of carrier-wave signals based upon the information to be transmitted and a corresponding one of the plurality of digits generated by said second generating means.

21. The apparatus according to claim 1, wherein said modulating means comprises adding means for adding a plurality of modulated signals supplied from said modulating means.

22. The apparatus according to claim 8, wherein said modulating means comprises adding means or adding a plurality of modulated signals.

23. The apparatus according to claim 8, wherein each of said plurality of multiplying means multiplies tow digits included in the plurality of digits of the spread-spectrum code sequence by a corresponding digit representing the information to be transmitted.

24. The apparatus according to claim 11, wherein said reverse spreading means reverse-spreads the received signal, for each of the plurality frequency bands, based upon two digits included in the plurality of digits generated by said generating means.

25. A spread-spectrum communication system comprising:
a transmitting side for modulating each of a plurality of carrier-wave signals having different frequencies, based upon information to be transmitted and a plurality of digits of a spread-spectrum core sequence; and a receiving side for demodulating a received signal for each of a plurality of frequency bands based upon search of the plurality of digits of the spread-spectrum code sequence and for discriminating the information based upon a demodulated result of each of the plurality of frequency bands, the plurality of frequency bands corresponding to frequencies of the plurality of carrier-wave signals.

26. The system according to claim 25, wherein said transmitting side comprises adding means for adding a plurality of modulated signals.

27. The system according to claim 25, wherein said transmitting side modulates each of the plurality of carrier-wave signals based upon the information to be transmitted and two digits included in the plurality of digits of the spread-spectrum code sequence.

28. The system according to claim 25, wherein said receiving side comprises a plurality of band-pass filters for splitting the received signal into a plurality of bandwidths.

29. The system according to claim 25, wherein said receiving side comprises a plurality of demodulators for demodulating each of the plurality of frequency bands.

30. The system according to claim 29, wherein said receiving side comprise a plurality of multipliers for multiplying an output of each of the plurality of modulators by the plurality of digits of the spread-spectrum code sequence.

31. The system according to claim 30, wherein said receiving side comprise an adder for adding outputs of the plurality of multipliers, said receiving side discriminating the information to be transmitted based upon an output of said adder.

32. The system according to claim 30, wherein each of said plurality of multipliers multiplies an output of each of the plurality of demodulators by two digits included in the plurality of digits of the spread-spectrum code sequence.

33. The apparatus according to claim 25, wherein said transmitting side modulates each of the plurality of carrier-wave signals in parallel based upon the information to be transmitted and the plurality of digits of the spread-spectrum code sequence.

34. A wireless communication system comprising:
a transmitting side for modulating each of a plurality of carrier-wave signals having different frequencies, based upon information to be transmitted; and
a receiving side for demodulating a received signal for each of a plurality of frequency bands and discriminating information based upon a demodulated result of each of the plurality of frequency bands, wherein the plurality of frequency bands correspond to the frequencies of the plurality of carrier-wave signals.

35. The system according of claim 34, wherein said transmitting side comprise a plurality of modulators, and wherein the information to be transmitted is supplied to the plurality of modulators in parallel.

36. The system according to claim 35, wherein said transmitting side comprises an adder for adding the outputs of the plurality of modulators.

37. The system according to claim 34, wherein said transmitting side comprises a plurality of multipliers for multiplying the information to be transmitted by a plurality of corresponding bits of a spread-spectrum core sequence; and
a plurality of modulators for modulating each of the plurality of carrier-wave signals based upon outputs of the plurality of multipliers.

38. The system according to claim 34, wherein said receiving side comprises a plurality of demodulators for demodulating each of the plurality of frequency bands and discriminating means for discriminating the information based upon outputs of the plurality of modulators.

39. The system according of claim 38, wherein said receiving side comprises an adder for adding outputs of the plurality of demodulators, and wherein said discrimination means discriminates the information based upon an output of the adder.

40. The system according to claim 34, wherein said receiving side comprises a plurality of band-pass filters for splitting the received signal into a plurality of bandwidths.

41. The system according to claim 34, wherein said receiving side comprises;
a plurality of modulators for demodulating each of the plurality of frequency bands;
a plurality of multipliers for multiplying outputs of the plurality of demodulators by a plurality of digits of the spread-spectrum code sequence; and
discriminating means for discriminating the information based upon outputs of the plurality of demodulators.

42. A wireless signal receiving apparatus comprising:
a plurality of demodulating means for demodulating a received signal for each of a plurality of frequency bands; and
discriminating means for discriminating original data based upon an average of a plurality of demodulated results output by the plurality of demodulating means.

43. The apparatus according to claim 42, wherein each of the plurality of demodulating means comprises a band-pass filter for splitting the received signal.

44. The apparatus according to claim 42, wherein said discriminating means comprises an adder for adding the plurality of demodulated results output by the plurality of demodulating means, said discriminating means discriminating the original data based upon an output of the adder.

45. The apparatus according to claim 42, wherein each of the plurality of demodulating means comprises a demodulator for demodulating the received signal, and a multiplier for multiplying output of the demodulator by each of a plurality of digits of a spread-spectrum code sequence.

* * * * *

UNITED STATES PATENT AND TRADEMARK OFFICE
CERTIFICATE OF CORRECTION

PATENT NO. : 5,177,767

DATED : January 5, 1993

INVENTOR(S) : ICHIRO KATO

Page 1 of 3

It is certified that error appears in the above-identified patent and that said Letters Patent is hereby corrected as shown below:

COLUMN 1

Line 20, "spread spectrum" should read --spread-spectrum--.

COLUMN 2

Line 22, "spread. spec-" should read --spread-spec- --.
Line 23, "code." should read --code- --.
Line 29, "spread." should read --spread- --.
Line 32, "spread spectrum" should read --spread-spectrum--.

COLUMN 3

Line 64, "FSK" (second occurrence) should read --FSK- --.

COLUMN 4

Line 17, "1004-n" should read --104-n--.
Line 24, "spread. spectrum" should read --spread-spectrum--.
Line 28, "spread. spectrum" should read --spread-spectrum--.
Line 35, "$\sqrt{n}$ fold" should read --$\sqrt{n}$-fold--.
Line 41, "spread spectrum" should read --spread-spectrum--.
Line 42, "spread spectrum" should read --spread-spectrum--.
Line 58, "spread. spectrum" should read --spread-spectrum--.
Line 59, "multipliers 314 1" should read
 --multipliers 314-1--.

COLUMN 5

Line 30, "$(f1+f_i'; j=1 \ldots n)$" should read
 --$(f_j+f_i'; j=1 \ldots n)$--.

UNITED STATES PATENT AND TRADEMARK OFFICE
CERTIFICATE OF CORRECTION

PATENT NO. : 5,177,767
DATED : January 5, 1993
INVENTOR(S) : ICHIRO KATO

It is certified that error appears in the above-identified patent and that said Letters Patent is hereby corrected as shown below:

<u>COLUMN 5</u>

Line 31, "$(f]f_i'; j=1 \ldots n).$" should read
--$(f_j-f_i'; j=1 \ldots n).$-- and
"$(fIF=fif_i')$" should read --$(f_{IF}=f_i-f_i')$--.

Line 53, "112-n" should read --612-n--.

<u>COLUMN 6</u>

Line 23, "spread spectrum" should read --spread-spectrum--.
Line 62, "different" should read --differ--.

<u>COLUMN 7</u>

Line 4, "comprise" should read --comprises--.
Line 25, "transmitted," should read --transmitted--.
Line 47, "mean" should read --means--.
Line 54, "ceive" should read --ceived--.
Line 58, "procured" should read --produced--.
LIne 62, "levers" should read --reverse--.

<u>COLUMN 8</u>

Line 19, "core" should read --code--.
Line 51, "or" should read --for--.
Line 55, "tow" should read --two--.
Line 61, "plurality" should read --plurality of--.

<u>COLUMN 9</u>

Line 1, "core" should read --code--.
Line 5, "search" should read --each--.

UNITED STATES PATENT AND TRADEMARK OFFICE
CERTIFICATE OF CORRECTION

PATENT NO. : 5,177,767
DATED     : January 5, 1993
INVENTOR(S) : ICHIRO KATO

It is certified that error appears in the above-identified patent and that said Letters Patent is hereby corrected as shown below:

<u>COLUMN 9</u>

Line 27, "comprise" should read --comprises--.
   Line 32, "comprise" should read --comprises--.
   Line 58, "comprise" should read --comprises--.

<u>COLUMN 10</u>

Line 28, "comprises;" should read --comprises:--.
   Line 29, "modulators" should read --demodulators--.

Signed and Sealed this

Nineteenth Day of April, 1994

BRUCE LEHMAN

Attest:

Attesting Officer

Commissioner of Patents and Trademarks